US009209482B2

(12) United States Patent
Chu et al.

(10) Patent No.: US 9,209,482 B2
(45) Date of Patent: Dec. 8, 2015

(54) POSITIVE ACTIVE MATERIAL FOR RECHARGEABLE LITHIUM BATTERY, METHOD OF MANUFACTURING THE SAME AND RECHARGEABLE LITHIUM BATTERY USING THE SAME

(75) Inventors: Hee-Young Chu, Yongin-si (KR); Sung-Hwan Moon, Yongin-si (KR); Jae-Hyuk Kim, Yongin-si (KR); Myung-Hwan Jeong, Yongin-si (KR); Chang-Ui Jeong, Yongin-si (KR); Jong-Seo Choi, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 148 days.

(21) Appl. No.: 13/137,554

(22) Filed: Aug. 25, 2011

(65) Prior Publication Data

US 2012/0231322 A1    Sep. 13, 2012

(30) Foreign Application Priority Data

Mar. 10, 2011   (KR) ...................... 10-2011-0021422

(51) Int. Cl.

| H01M 4/131 | (2010.01) |
|---|---|
| H01M 10/052 | (2010.01) |
| H01M 2/16 | (2006.01) |
| H01M 4/13 | (2010.01) |
| H01M 4/38 | (2006.01) |
| H01M 4/485 | (2010.01) |

(Continued)

(52) U.S. Cl.
CPC .......... *H01M 10/052* (2013.01); *H01M 2/1653* (2013.01); *H01M 4/13* (2013.01); *H01M 4/131* (2013.01); *H01M 4/38* (2013.01); *H01M 4/485* (2013.01); *H01M 4/505* (2013.01); *H01M 4/525* (2013.01); *Y02E 60/122* (2013.01)

(58) Field of Classification Search
None
See application file for complete search history.

(56) References Cited

U.S. PATENT DOCUMENTS 7,060,392 B2 *    6/2006  Kim .............................. 429/340
2002/0122983 A1 *  9/2002  Nakai et al. ................ 429/231.1

FOREIGN PATENT DOCUMENTS

| JP | 2009-064576 A | 3/2009 | |
|---|---|---|---|
| JP | 2009-064732 A | 3/2009 | |
| JP | 2009-200007   * | 9/2009 | ............. H01M 4/36 |

(Continued)

OTHER PUBLICATIONS

Machine translation of JP 2009-200007, retrieved from <http://www19.ipdl.inpit.go.jp/PA1/cgi-bin/PA1DETAIL> on Jun. 13, 2013.*

(Continued)

*Primary Examiner* — Cynthia K Walls
(74) *Attorney, Agent, or Firm* — Lee & Morse, P.C.

(57) ABSTRACT

A positive active material for a rechargeable lithium battery, a method of manufacturing the same, and a rechargeable lithium battery using the same, the positive active material including a secondary particle formed of a plurality of primary particles, the primary particles being made of a metal compound capable of intercalating/deintercalating lithium; and a coating layer on a surface of the secondary particle in an island arrangement, the coating layer including a metal oxide, wherein the secondary particle includes pores formed by the primary particles, the pores including a surface pore on the surface of the secondary particle and an internal pore inside the secondary particle, and the metal oxide of the coating layer fills a portion of the surface pore of the secondary particle.

7 Claims, 7 Drawing Sheets

(51) Int. Cl.
*H01M 4/505* (2010.01)
*H01M 4/525* (2010.01)

(56) References Cited

FOREIGN PATENT DOCUMENTS

| JP | 2009-301749 A | 12/2009 |
|---|---|---|
| KR | 10-2002-0006387 A | 1/2002 |
| KR | 10-2002-0039099 A | 5/2002 |
| KR | 10-2002-0091748 A | 12/2002 |
| KR | 10-2007-0081831 A | 8/2007 |
| WO | WO 2009/031036 A2 | 3/2009 |

OTHER PUBLICATIONS

Kim, et al.; Synthesis and electrochemical characteristics of $Al_2O_3$-coated $LiNi_{1/3}Co_{1/3}Mn_{1/3}O_2$ cathode materials for lithium ion batteries; Electrochimica Acta Aug. 28, 2006; vol. 52; pp. 1316-1322; Elsevier; USA.

Korean Office Action in KR 10-2011-0021422, dated Oct. 26, 2012 (Chu, et al.).

Korean Notice of Office Action dated Jul. 28, 2013.

\* cited by examiner

FIG.9
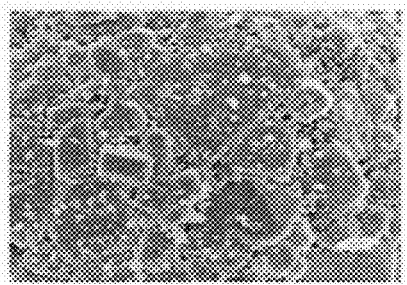 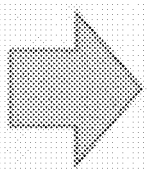 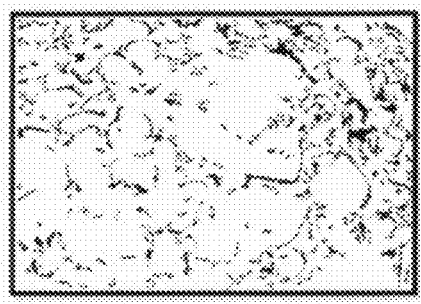
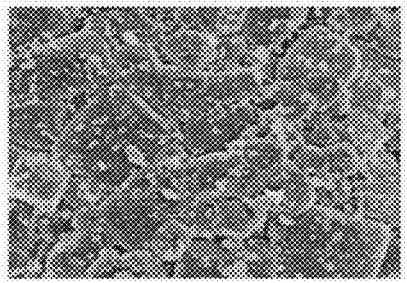 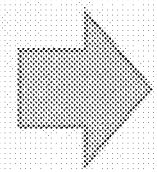 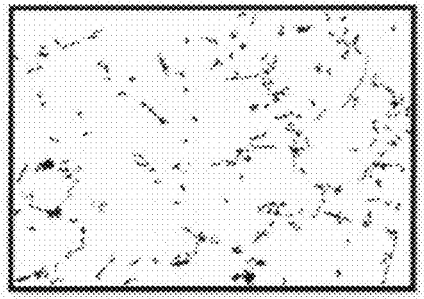

POSITIVE ACTIVE MATERIAL FOR RECHARGEABLE LITHIUM BATTERY, METHOD OF MANUFACTURING THE SAME AND RECHARGEABLE LITHIUM BATTERY USING THE SAME

BACKGROUND

1. Field

Embodiments relate to a positive active material for a rechargeable lithium battery, a method of manufacturing the same, and a rechargeable lithium battery including the same.

2. Description of the Related Art

Due to reductions in size and weight of portable electronic equipment, batteries have been developed for use in the portable electronic equipment such that the batteries have both high performance and a large capacity.

Batteries generate electric power using an electrochemical reaction material for a positive electrode and a negative electrode. Rechargeable lithium batteries generate electrical energy from changes of chemical potential during intercalation/deintercalation of lithium ions at the positive and negative electrodes.

For example, rechargeable lithium batteries use materials that reversibly intercalate or deintercalate lithium ions during charge and discharge reactions for both positive and negative active materials. The rechargeable batteries may include an organic electrolyte or a polymer electrolyte between the positive electrode and the negative electrode.

For positive active materials of a rechargeable lithium battery, lithium composite metal compounds have been used, and lithium composite metal oxides such as $LiCoO_2$, $LiMn_2O_4$, $LiNiO_2$, $LiNi_{1-x}Co_xO_2$ (0<x<1), $LiMnO_2$, or the like, have been researched.

SUMMARY

Embodiments are directed to a positive active material for a rechargeable lithium battery, a method of manufacturing the same, and a rechargeable lithium battery including the same.

The embodiments may be realized by providing a positive active material for a rechargeable lithium battery, the positive active material including a secondary particle formed of a plurality of primary particles, the primary particles being made of a metal compound capable of intercalating/deintercalating lithium; and a coating layer on a surface of the secondary particle in an island arrangement, the coating layer including a metal oxide, wherein the secondary particle includes pores formed by the primary particles, the pores including a surface pore on the surface of the secondary particle and an internal pore inside the secondary particle, and the metal oxide of the coating layer fills a portion of the surface pore of the secondary particle.

The metal oxide of the coating layer may fill a portion of the internal pore of the secondary particle.

A filling ratio of the metal oxide in the surface pore may be a ratio of an area of the surface pore filled with metal oxide relative to a total area of the surface pore, and the filling ratio may be about 1.3 or higher.

A metal of the metal oxide may include Li, B, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, or a mixture thereof.

The metal compound capable of intercalating/deintercalating lithium may include at least one of $Li_aA_{1-b}X_bD_2$ (0.90≤a≤1.8, 0≤b≤0.5); $Li_aA_{1-b}X_bO_{2-c}T_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}T_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG'_bO_2$ (0.90≤a≤1.8, 0.001≤b≤0.1); $Li_aMn_2G_bO_4$ (0.90≤a≤1.8, 0.001≤b≤0.1); $Li_aMnG'_bPO_4$ (0.90≤a≤1.8, 0.001≤b≤0.1); $LiNiVO_4$; and $Li_{(3-f)}J_2(PO_4)_3$ wherein A is Ni, Co, Mn, or combinations thereof; X is Al, Ni, Co, Mn, Cr, Fe, Mg, Sr, V, a rare earth element, or combinations thereof; D is O, F, S, P, or combinations thereof; E is Co, Mn, Ni, or combinations thereof; T is F, S, P, or combinations thereof; G is Ni, Al, Cr, Mn, Fe, Mg, La, Ce, Sr, V, or combinations thereof; G' is Ni, Al, Cr, Fe, Mg, La, Ce, Sr, V, or combinations thereof; Q is Ti, Mo, Mn, Ni, or combinations thereof; Z is Cr, V, Fe, Sc, Y, Ni, or combinations thereof; and J is V, Cr, Mn, Co, Ni, Cu, or combinations thereof.

The embodiments may also be realized by providing a method of manufacturing a positive active material for a rechargeable lithium battery, the method including preparing a coating liquid including a coating element-included compound in a solvent; mixing the coating liquid with a secondary particle agglomerated with primary particles to provide a mixture, the primary particle being made of a metal compound capable of intercalating/deintercalating lithium; vacuum-treating the mixture; and drying the vacuum-treated mixture.

The vacuum-treating may be performed for about 3 to about 5 hours.

The drying may be performed at a temperature of about 100 to about 140° C.

Preparing the coating liquid may include dispersing the coating element-included compound in the solvent, the dispersing including using an ultrasonic wave.

The solvent may include ethanol, anhydrous ethanol, isopropyl alcohol, or a combination thereof.

The method may further include forming a secondary particle from a plurality of the primary particles such that the secondary particle includes pores surrounded the primary particles, wherein the pores include a surface pore on a surface of the secondary particle and an internal pore inside the secondary particle, a surface of the secondary particle is coated with the metal oxide such that the metal oxide has an island arrangement, and the metal oxide fills a portion of the surface pore of the secondary particle.

The metal oxide may fill a portion of the internal pore of the secondary particle.

A filling ratio of the metal oxide in the surface pore may be a ratio of an area of the surface pore filled with metal oxide relative to a total area of the surface pore, and the filling rate may be about 1.3 or higher.

A metal of the metal oxide may include Li, B, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, or a mixture thereof.

The metal compound capable of intercalating/deintercalating lithium may include at least one of $Li_aA_{1-b}X_bD_2$ (0.90≤a≤1.8, 0≤b≤0.5); $Li_aA_{1-b}X_bO_{2-c}T_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}T_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0≤α≤2); $Li_aNi_{1-b-c}Co_bX_cO_{2-\alpha}T_\alpha$ (0.90≤a≤1.8, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG'_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMnG'_bPO_4$ ($0.90 \leq a \leq 1.8$, $0.001 \leq b \leq 0.1$); $LiNiVO_4$; and $Li_{(3-f)}J_2(PO_4)_3$ ($0 \leq f \leq 2$) wherein A is Ni, Co, Mn, or combinations thereof; X is Al, Ni, Co, Mn, Cr, Fe, Mg, Sr, V, a rare earth element, or combinations thereof; D is O, F, S, P, or combinations thereof; E is Co, Mn, Ni, or combinations thereof; T is F, S, P, or combinations thereof; G is Ni, Al, Cr, Mn, Fe, Mg, La, Ce, Sr, V, or combinations thereof; G' is Ni, Al, Cr, Fe, Mg, La, Ce, Sr, V, or combinations thereof; Q is Ti, Mo, Mn, Ni, or combinations thereof; Z is Cr, V, Fe, Sc, Y, Ni, or combinations thereof; and J is V, Cr, Mn, Co, Ni, Cu, or combinations thereof.

The embodiments may also be realized by providing a rechargeable lithium battery including a positive electrode; a negative electrode; and an electrolyte, wherein the positive electrode includes a current collector and a positive active material layer on the current collector, the positive active material layer including the positive active material of an embodiment.

The electrolyte may include a non-aqueous organic solvent and a lithium salt.

The rechargeable lithium battery may further include a separator between the positive electrode and the negative electrode.

The separator may be a single-layer or a multi-layer structure including at least one of polyethylene, polypropylene, and polyvinylidene fluoride.

BRIEF DESCRIPTION OF THE DRAWINGS

The embodiments will become more apparent to those of ordinary skill in the art by describing in detail exemplary embodiments with reference to the attached drawings, in which:

FIG. 9 illustrates image analysis for calculating a filling ratio of metal oxide in a surface pore.

DETAILED DESCRIPTION

Figure 1:
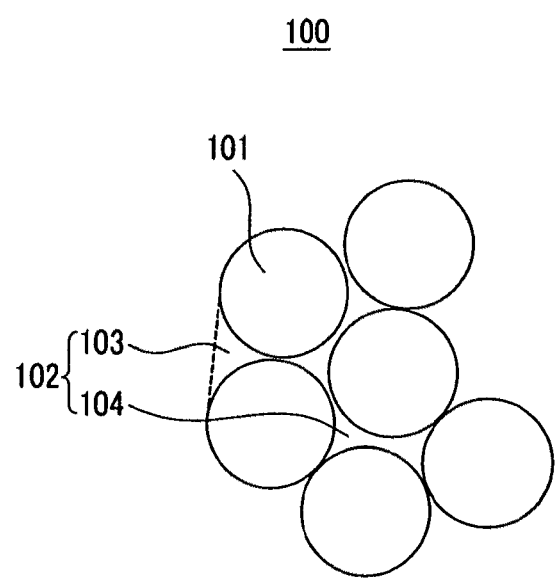
FIG. 1 illustrates a schematic view showing a secondary particle of a positive active material.

Korean Patent Application No. 10-2011-0021422, filed on Mar. 10, 2011, in the Korean Intellectual Property Office, and entitled: "Positive Active Material for Rechargeable Lithium Battery, Method of Manufacturing the Same and Rechargeable Lithium Battery Using the Same," is incorporated by reference herein in its entirety Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

An embodiment provides a positive active material for a rechargeable lithium battery. The positive active material may include a secondary particle formed of a plurality of primary particles. The primary particles may be made of a metal compound capable of intercalating/deintercalating lithium. The secondary particle may include pores formed by and surrounded by the primary particles. The pores may include a surface pore (on a surface of the secondary particle) and an internal pore (inside the secondary particle). The secondary particle may be coated with a coating layer formed of, e.g., metal oxide, and may have an island shape or arrangement. For example, the coating layer may fill the surface pore with the metal oxide.

FIG. 1 illustrates a schematic view showing a secondary particle of a positive active material.

As shown in FIG. 1, when a positive active material includes a secondary particle 100 (formed of a plurality of primary particles 101), the secondary particle 100 may include pores 102. The pores 102 may include an internal pore 104 (inside the secondary particle 100) as well as a surface pore 103.

Typically, pores may decrease an amount of coating particles (e.g., metal oxide) when a coating layer is formed on a surface of a positive active material. For example, the internal pore 104 may be hard to fill with coating particles and the coating particle may randomly on the surface of the positive active material and the surface pore 103 so that the surface pores 103 may be hard to fill with coating particles.

However, according to an embodiment, the surface pore 103 may be filled with coating particles.

In addition, an internal pore 104 (as well as the surface pore 103) may be filled with coating particles, e.g., metal oxide.

Figure 2:
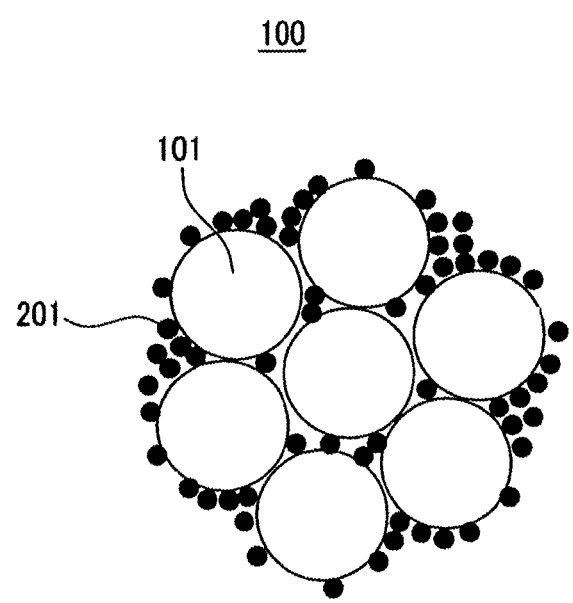
FIG. 2 illustrates a schematic view showing a positive active material according to an embodiment.

FIG. 2 illustrates a schematic view showing a positive active material according to an embodiment.

For example, FIG. 2 illustrates a secondary particle 100 formed of a plurality of primary particles 101 and coated with a coating layer including, e.g., metal oxide 201, thereon. As shown in FIG. 2, the surface pore 103 as well as the internal pore 104 (see FIG. 1) of the secondary particle 100 may be sufficiently filled with the metal oxide 201.

When the positive active material coated with metal oxide 201 is used to fabricate a rechargeable battery, the positive active material may be less reactive with an electrolyte, thereby improving cycle-life characteristics of the rechargeable battery.

Accordingly, the coating layer, as well as the aforementioned reason, may bring about improved structural or thermal stability of the positive active material.

A filling ratio (e.g., a ratio at which the metal oxide is filled in the surface pore) may be calculated as a ratio of an area of the surface pore filled with the metal oxide relative to a total area of the surface pore. In an implementation, the filling ratio may be about 1.3 or higher. In another implementation, the filling ratio may be about 1.3 to 5.0. The area may be determined from SEM images taken of the surface pore on top and may differ from an actual internal surface area inside the pore. For example, when a SEM image of the surface pore is taken from a top, the surface pore may appear two dimensional. Thus, an area of the surface pore may be measured to examine how much metal oxide is filled in the surface pore.

The metal oxide may be formed using one or more coating element compounds including, e.g., an oxide of a coating element, a hydroxide of a coating element, an oxyhydroxide of a coating element, an oxycarbonate of a coating element, or a hydroxycarbonate of a coating element. The metal oxide may be amorphous or crystalline. The coating element may include Li, B, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, or a mixture thereof.

The metal compound that is capable of intercalating/deintercalating lithium, e.g., that forms the primary particle, may include at least one of $Li_aA_{1-b}X_bD_2$ ($0.90 \leq a \leq 1.8$, $0 \leq b \leq 0.5$); $Li_aA_{1-b}X_bO_{2-c}T_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}T_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_4G_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$); $Li_aCoG_bO_2$ ($0.90 \leq a \leq 1.8$, $0.001 \leq b \leq 0.1$); $Li_aMnG'_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMnG'_bPO_4$ ($0.90 \leq a \leq 1.8$, $0.001 \leq b \leq 0.1$); $LiNiVO_4$; and $Li_{(3-f)}J_2(PO_4)_3$ ($0 \leq f \leq 2$).

In the above formulae, A may include, e.g., Ni, Co, Mn, and combinations thereof; X may include, e.g., Al, Ni, Co, Mn, Cr, Fe, Mg, Sr, V, a rare earth element, and combinations thereof; D may include, e.g., O, F, S, P, and combinations thereof; E may include, e.g., Co, Mn, Ni, and combinations thereof; T may include, e.g., F, S, P, and combinations thereof; G may include, e.g., Ni, Al, Cr, Mn, Fe, Mg, La, Ce, Sr, V, and combinations thereof; G' may include, e.g., Ni, Al, Cr, Fe, Mg, La, Ce, Sr, V, and combinations thereof; Q may include, e.g., Ti, Mo, Mn, Ni, and combinations thereof; Z may include, e.g., Cr, V, Fe, Sc, Y, Ni, and combinations thereof; and J may include, e.g., V, Cr, Mn, Co, Ni, Cu, and combinations thereof.

The positive active material for a rechargeable lithium battery according to an embodiment may be prepared by the following manufacturing method.

For example, the method may include a) preparing a coating liquid by mixing a coating element-included compound in a solvent; b) mixing the coating liquid with secondary particles agglomerated with primary particles, the primary particles being made of a metal compound capable of intercalating/deintercalating lithium; c) vacuum-treating the mixture prepared in the step b); and d) drying the vacuum-treated mixture prepared in the step c).

The vacuum treatment may remove air among the primary particles; and the coating liquid may sufficiently fill spaces where air has been, thereby preparing a positive active material.

The vacuum treatment may be performed for about 3 to about 5 hours. Performing the vacuum treatment for about 3 to about 5 hours may sufficiently accomplish the effect of releasing air among the secondary particles.

The drying of the vacuum-treated mixture may be performed at a temperature of about 100 to about 140° C. Performing the drying of the vacuum-treated mixture may help ensure that the metal oxide is sufficiently coated.

Preparing the coating liquid may include dispersing the coating element-included compound in the solvent and the dispersing may be accomplished by using an ultrasonic wave. Effective dispersion of the coating element-included compound in the solvent may facilitate filling the pores of the secondary particle with the metal oxide.

The coating element-included compound may be include an oxide of a coating element, a hydroxide of a coating element, an oxyhydroxide of a coating element, an oxycarbonate of a coating element, or a hydroxycarbonate of a coating element. At this time, when the hydroxide of a coating element, the oxyhydroxide of a coating element, the oxycarbonate of a coating element, or the hydroxycarbonate of a coating element is used, dispersion may not be performed. The coating element may include Li, B, Na, Mg, Al, Si, P, Ca, Sc, Ti, V, Cr, Mn, Fe, Co, Ni, Cu, Zn, Ga, Ge, As, Sr, Y, Zr, Nb, Mo, Sn, Ba, Hf, La, or a mixture thereof.

The solvent may include, e.g., ethanol, anhydrous ethanol, isopropyl alcohol, or a combination thereof, but is not particularly limited.

The resulting prepared positive active material for a rechargeable lithium battery may include a secondary particle formed of a plurality of primary particles (made of the metal compound capable of intercalating/deintercalating lithium). The secondary particle may include pores. The pores may include a surface pore (on a surface of the secondary particle) and an internal pore (inside the secondary particle). The secondary particle may be coated with the coating layer e.g., the metal oxide, in an island arrangement. For example, the coating layer may fill the surface pore with the metal oxide.

Another embodiment provides a rechargeable lithium battery that includes a positive electrode, a negative electrode, and an electrolyte. The positive electrode includes a current collector and a positive active material layer on the current collector. The positive active material layer may include the positive active material of an embodiment. The positive active material layer may also include a binder and a conductive material.

The binder may improve binding properties of the positive active material particles to one another and also with the current collector. Examples of the binder may include polyvinyl alcohol, carboxylmethyl cellulose, hydroxypropyl cellulose, diacetyl cellulose, polyvinylchloride, carboxylated polyvinyl chloride, polyvinylfluoride, polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

The conductive material may improve electrode conductivity. Any suitable electrically conductive material that doesn't cause a chemical change may be used, e.g., a carbon-based material such as natural graphite, artificial graphite, carbon black, acetylene black, ketjen black, carbon fiber; a metal powder or a metal fiber including copper, nickel, aluminum, silver; a conductive polymer such as a polyphenylene derivative, or a conductive material including a mixture thereof.

The negative electrode may include a current collector and a negative active material layer on the current collector. The negative active material layer may include a negative active material.

The negative active material may include a material that reversibly intercalates/deintercalates lithium ions, a lithium metal, a lithium metal alloy, a material doped and dedoped with lithium, or a transition metal oxide.

The material that reversibly intercalates/deintercalates lithium ions may include any suitable carbon-based negative active material, e.g., crystalline carbon, amorphous carbon, or a combination thereof. The crystalline carbon may include, e.g., shapeless graphite, sheet-type graphite, flake-type graphite, spherical-shaped graphite or fiber-shaped natural graphite, artificial graphite, and a mixture thereof. The amorphous carbon may include, e.g., soft carbon, hard carbon, mesophase pitch carbide, fired cokes, or a mixture thereof.

The lithium metal alloy may include a lithium alloy with a metal including, e.g., Na, K, Rb, Cs, Fr, Be, Mg, Ca, Sr, Si, Sb, Pb, In, Zn, Ba, Ra, Ge, Al, and/or Sn.

The material doped and dedoped with lithium may include, e.g., Si, $SiO_x$ ($0<x<2$), a Si—Y alloy (Y is an alkali metal, an alkaline-earth metal, a Group 13 element, a Group 14 element, a Group 15 element, a Group 16 element, a transition element, a rare earth element, and a combination thereof, but is not Si), Sn, $SnO_2$, Sn—Y (Y is an alkali metal, an alkaline-earth metal, a Group 13 element, a Group 14 element, a Group 15 element, a Group 16 element, a transition element, a rare earth element, and a combination thereof, but is not Sn), and the like, or a mixture of at least one thereof with $SiO_2$. The element Y may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may include, e.g., vanadium oxide, lithium vanadium oxide, and the like.

In an implementation, the negative active material layer may include a binder and/or a conductive material.

The binder may bind negative active material particles together and may also bind the negative active material to the current collector. Examples of the binder may include polyvinyl alcohol, carboxylmethylcellulose, hydroxypropylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, or nylon, but is not limited thereto.

The conductive material may improve electrode conductivity. Any suitable electrically conductive material that does not cause a chemical change may be used, e.g., a carbon-based material such as natural graphite, artificial graphite, carbon black, acetylene black, ketjen black, a carbon fiber, and the like; a metal-based material such as a metal powder or a metal fiber including copper, nickel, aluminum, silver, and on the like; a conductive polymer such as a polyphenylene derivative, or mixtures thereof.

The current collector may be formed of, e.g., a copper foil, a nickel foil, a stainless steel foil, a titanium foil, a nickel foam, a copper foam, a polymer substrate coated with a conductive metal, or a combination thereof. In an implementation, the current collector may include Al, but is not limited thereto.

The negative electrode and the positive electrode may be fabricated by mixing the active material, the conductive material, and the binder in a solvent to prepare an active material composition, and coating the composition on the current collector. The solvent may include, e.g., N-methylpyrrolidone, or the like, but is not limited thereto.

The electrolyte may include a non-aqueous organic solvent and a lithium salt.

The non-aqueous organic solvent may facilitate transfer of ions that are related to an electrochemical reaction of a battery.

The non-aqueous organic solvent may include, e.g., a carbonate-based, an ester-based, an ether-based, a ketone-based, an alcohol-based, and/or an aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC). Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone(caprolactone), or the like. Examples of the ether-based solvent may include dibutyl ether, tetraglyme, diglyme, dimethoxyethane, 2-methyltetrahydrofuran, tetrahydrofuran, or the like. Examples of the ketone-based solvent may include cyclohexanone or the like. Examples of the alcohol-based solvent may include ethanol, isopropyl alcohol, and the like. Examples of the aprotic solvent may include R—CN (wherein R is a C2 to C20 linear, branched, or cyclic hydrocarbon moiety and may include a double bond, an aromatic ring, or an ether bond), amides such as dimethylformamide, dioxolanes such as 1,3-dioxolane, sulfolanes, and the like.

The non-aqueous organic solvent may be used singularly or as a mixture. When the organic solvent is used as a mixture, a mixture ratio thereof may be controlled in accordance with desired battery performance.

The carbonate-based solvent may include a mixture of a cyclic carbonate and a linear carbonate. The cyclic carbonate and the linear carbonate may be mixed together in a volume ratio of about 1:1 to about 1:9. When the mixture is used as an electrolyte, the electrolyte performance may be enhanced.

In addition, the electrolyte of an embodiment may further include mixtures of carbonate. Carbonate-based solvents and aromatic hydrocarbon-based solvents may be mixed together in a volume ratio of about 1:1 to about 30:1.

The aromatic hydrocarbon-based organic solvent may be represented by the following Chemical Formula 1.

[Chemical Formula 1]

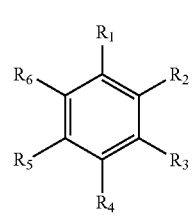

In Chemical Formula 1, $R_1$ to $R_6$ may each independently be hydrogen, a halogen, a C1 to C10 alkyl, a C1 to C10 haloalkyl, or a combination thereof.

Examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In order to improve a battery cycle-life, the non-aqueous electrolyte may further include a vinylene carbonate or an ethylene carbonate-based additive represented by the following Chemical Formula 2.

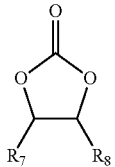

[Chemical Formula 2]

In Chemical Formula 2, $R_7$ and $R_8$ may each independently be hydrogen, a halogen, a cyano group (CN), a nitro group ($NO_2$), or a C1 to C5 fluoroalkyl group, provided that at least one of $R_7$ and $R_8$ is halogen, a cyano group (CN), a nitro group ($NO_2$), or a C1 to C5 fluoroalkyl.

The ethylene carbonate-based compound may include, e.g., difluoroethylene carbonate, chloroethylene carbonate, dichloroethylene carbonate, bromoethylene carbonate, dibromoethylene carbonate, nitroethylene carbonate, cyanoethylene carbonate, and/or fluoroethylene carbonate. The additive may be included in an amount suitable for improving cycle life characteristics.

The lithium salt provides lithium ions in the battery, facilitates basic operation of the rechargeable lithium battery, and improves lithium ion transport between positive and negative electrodes. Non-limiting examples of the lithium salt may include a supporting salt, e.g., $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate, LiBOB). The lithium salt may be used at about a 0.1 to about 2.0 M concentration. When the lithium salt is included at the above concentration range, electrolyte performance and lithium ion mobility may be enhanced due to optimal electrolyte conductivity and viscosity.

The rechargeable lithium battery may further include a separator between the negative electrode and positive electrode. Non-limiting examples of suitable separator materials may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Rechargeable lithium batteries may include, e.g., lithium ion batteries, lithium ion polymer batteries, and lithium polymer batteries according to the presence of a separator and the kind of electrolyte used in the battery. The rechargeable lithium batteries may have a variety of shapes and sizes, and may include cylindrical, prismatic, or coin-type batteries, and may be thin film batteries or may be rather bulky in size. Structures and fabricating methods for lithium ion batteries pertaining to this disclosure are well known in the art.

Figure 3:
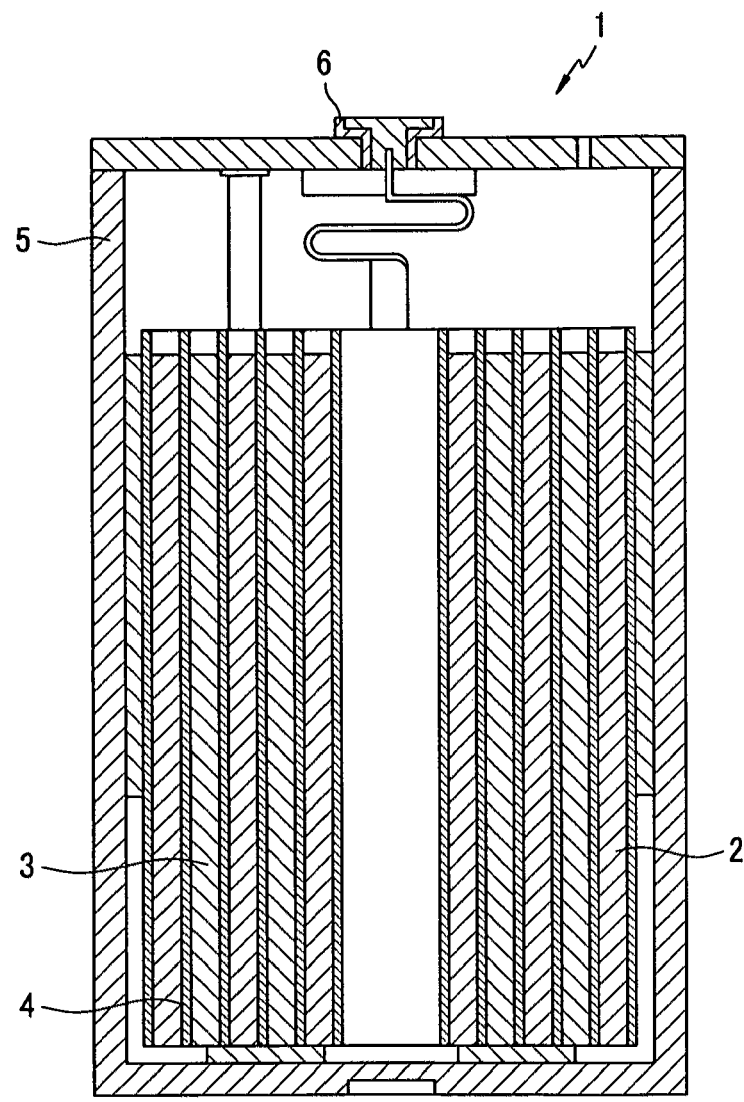
FIG. 3 illustrates cross-sectional view of a rechargeable lithium battery according to an embodiment.

FIG. 3 illustrates a schematic view of a rechargeable lithium battery. For example, FIG. 3 illustrates a rechargeable lithium battery 1 including a positive electrode 3, a negative electrode 2, a battery case 5 (including an electrolyte solution impregnating a separator 4 interposed between the positive electrode 3 and the negative electrode 2), and a sealing member 6 sealing the battery case 5.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

EXAMPLES

Example 1

Preparation of a Positive Active Material 0.2 g of nano sized $Al_2O_3$ was added to 10 ml of ethanol. The mixture was dispersed with an ultrasonic instrument, thereby preparing a coating liquid. The coating liquid was mixed with 9.8 g of $LiNi_{0.4}Co_{0.3}Mn_{0.3}O_2$. The mixture was put in a room temperature vacuum oven and allowed to stand for 4 hours. The vacuum oven was heated up to 120° C. to remove solvent.

Comparative Example 1

Preparation of a Positive Active Material

A positive active material was prepared according to the same method as
Example 1 except that the vacuum treatment was not performed.

Example 2

Fabrication of a Half-Cell

The positive active material according to Example 1, a polyvinylidenefluoride binder, and a carbon conductive material were dispersed in N-methylpyrrolidone solvent in a weight ratio of 92:4:4, thereby preparing a positive active material slurry. The positive active material slurry was coated on a 50 μm-thick aluminum film to fabricate a thin substrate. The substrate was dried at 120° C. for 3 hours or more and compressed, thereby fabricating a positive electrode.

A polyethylene separator was disposed between the positive electrode and a lithium metal counter electrode, and an electrolyte was implanted therein, thereby fabricating a coin-type half-cell. The electrolyte was prepared by preparing a 1.3 M solution of $LiPF_6$ in a mixed solvent (prepared by mixing ethylene carbonate (EC), ethylmethylcarbonate (EMC), and dimethylcarbonate (DMC) in a volume ratio of 3:4:3).

Comparative Example 2

Fabrication of a Half-Cell

A coin-type half cell was fabricated according to the same method as Example 2 except for using the positive active material according to Comparative Example 1 instead of the positive active material according to Example 1.

Experimental Example

Scanning Electron Microscope (SEM)

Figure 4:
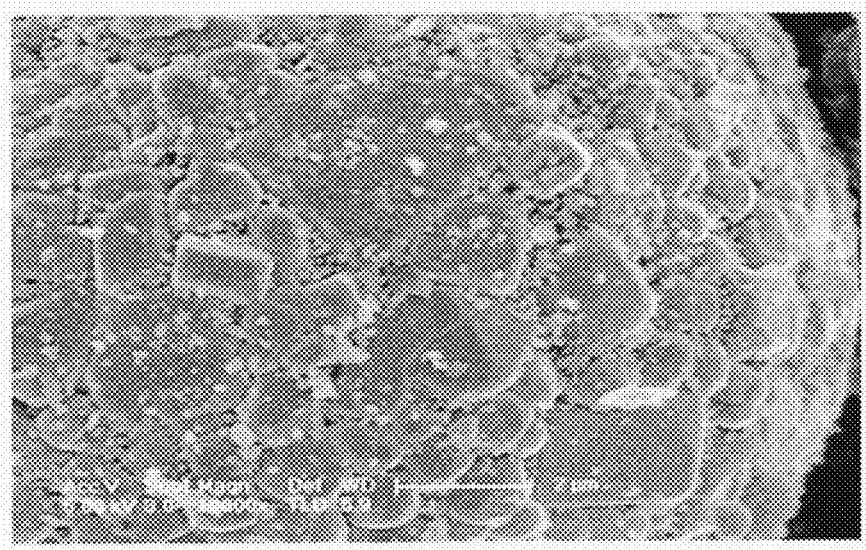
FIG. 4 illustrates a 10,000× magnified SEM image of a positive active material prepared according to Example 1.
Figure 5:
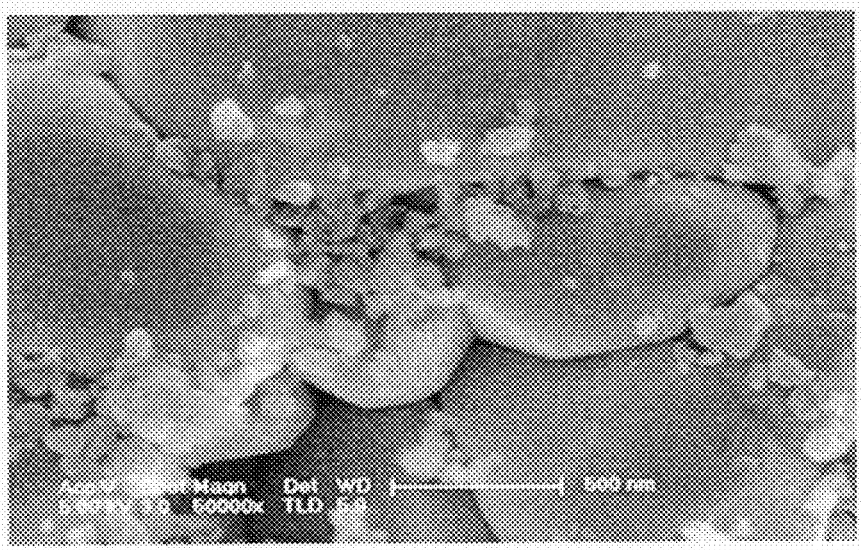
FIG. 5 illustrates a 50,000× magnified SEM image of a positive active material prepared according to Example 1.
Figure 6:
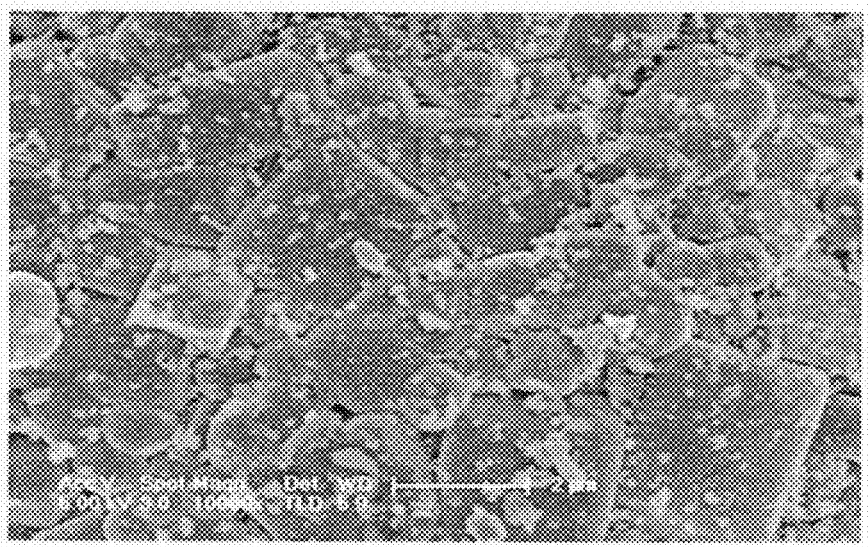
FIG. 6 illustrates a 10,000× magnified SEM image of a positive active material prepared according to Comparative Example 1.
Figure 7:
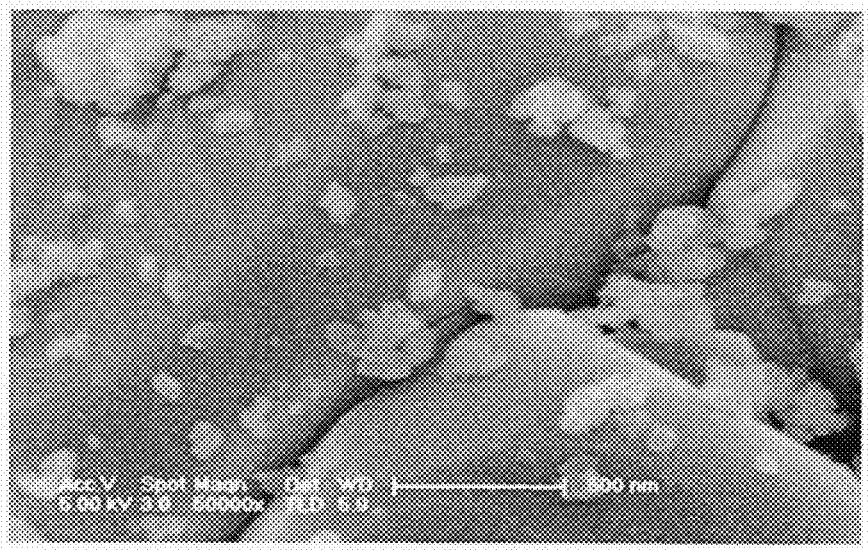
FIG. 7 illustrates a 50,000× magnified SEM image of a positive active material prepared according to Comparative Example 1.

FIG. 4 illustrates a 10,000× magnified SEM image showing the positive active material prepared according to Example 1. FIG. 5 illustrates a 50,000× magnified SEM image showing the positive active material prepared according to Example 1. FIG. 6 illustrates a 10,000× magnified SEM image showing the positive active material prepared according to Comparative Example 1. FIG. 7 illustrates a 50,000× magnified SEM image showing the positive active material prepared according to Comparative Example 1.

Comparing the SEM images of the positive active material according to Example 1 and Comparative Example 1, the pores on the surface of the positive active material according to Example 1 were sufficiently filled with a metal oxide. Furthermore, the metal oxide was presented on the surface of the positive active material according to Example 1 in an island arrangement.

Cell Performance

The coin-type half cells according to Example 2 and Comparative Example 2 were evaluated regarding cell performance. The results are provided in FIG. 8.

Figure 8:
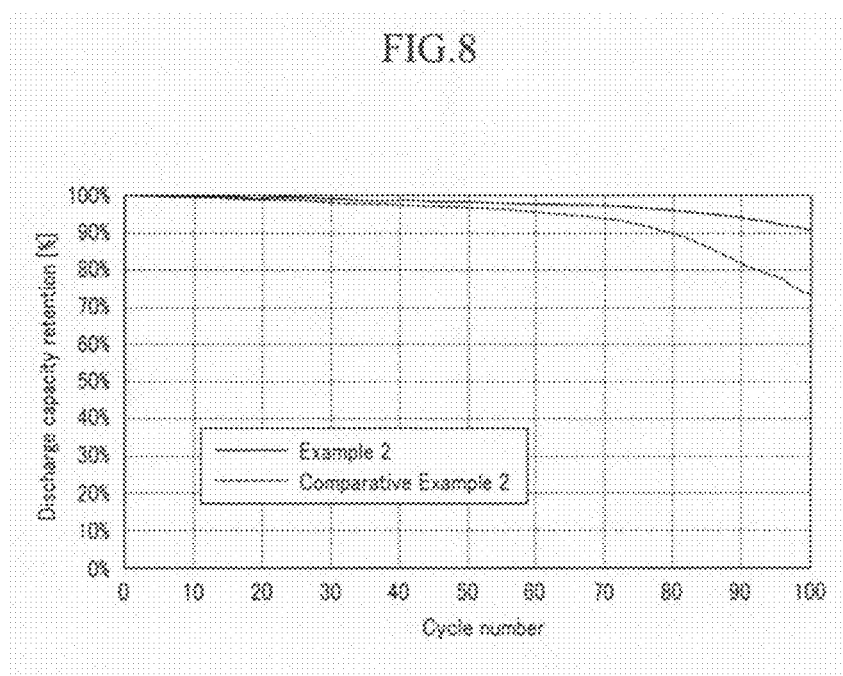
FIG. 8 illustrates a graph showing cell performance of half-cells prepared according to Example 2 and Comparative Example 2.

As shown in FIG. 8, when the half-cells were compared regarding discharge capacity after 100 cycles, the cell according to Example 2 had a capacity of 90% or more and the cell according to Comparative Example 2 had a capacity of 70%. For example, the battery cell fabricated according to Example 1 exhibited remarkably improved cycle-life.

Calculation of Filling Ratio

Areas on the surfaces of the positive active materials according to Example 1 and Comparative Example 1 were measured to calculate the filling ratio of metal oxide filled in the pores on the surfaces.

The areas were measured by using an image analysis program (an image J). The image of the surface pore part in FIG. 4 (the positive active material according to Example 1) and FIG. 6 (the positive active material according to Comparative Example 1) was extracted to calculate a relative area.

FIG. 9 illustrates an image analysis result for calculating a filling ratio. The relative area ratio between Example 1 and Comparative Example 1 was 30586:24241.

When metal oxide was coated in an amount of about 2 wt % based on a total weight of the positive active material, the positive active material (prepared using an impregnation wet method using a vacuum treatment according to Example 1) had an area ratio of metal oxide in the surface pores of about 1.3 times larger, when compared with the positive active material coated using a typical wet coating (Comparative Example 1). However, this result is from image analysis of only the surface part of the positive active material. Accordingly, particles in the internal pore of the positive active material may have a bigger particle ratio.

By way of summation and review, manganese-based positive active materials, e.g., $LiMn_2O_4$ or $LiMnO_2$, are the easiest to synthesize, are less costly than the other materials, have excellent thermal stability compared to the other active materials during overcharging, and are environmentally friendly. However, these manganese-based materials have a relatively low capacity.

$LiCoO_2$ is a commercially available positive active material and has good electrical conductivity, a high battery voltage of about 3.7V, excellent cycle-life characteristics, high stability, and excellent discharge capacity. However, $LiCoO_2$ is expensive and is responsible for about 30% or more of the total cost of a battery.

Also, $LiNiO_2$ has the highest discharge capacity battery characteristics among the mentioned positive active materials, but is difficult to synthesize. Further, high oxidation states of nickel may cause battery and electrode cycle-life deterioration and bring about easy self-discharge and lowered reversibility. Furthermore, it is difficult to fabricate a commercially viable battery due to difficulties in ensuring stability.

Accordingly, the embodiments provide a positive active material that is economical and has stability, high-capacity, improved electrical conductivity, and high rate capability.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A positive active material for a rechargeable lithium battery, the positive active material comprising:
   a secondary particle formed of a plurality of primary particles, the primary particles being made of a metal compound capable of intercalating/deintercalating lithium; and
   a coating layer on a surface of the secondary particle in an island arrangement having a varying distribution, the coating layer including a metal oxide,
   wherein:
      the secondary particle includes pores formed by the primary particles, the pores including a surface pore on the surface of the secondary particle and an internal pore inside the secondary particle,
      the metal oxide of the coating layer fills a portion of the surface pore of the secondary particle,
      the metal oxide of the coating layer fills a portion of the internal pore of the secondary particle in response to a vacuum treatment of a mixture of the secondary particle and a coating liquid, and
      a metal of the metal oxide includes Li, Na, Mg, Al, Ca, Sc, Ti, V, Cr, Mn, Fe, Co, Ni, Cu, Zn, Ga, Ge, As, Sr, Y, Zr, Nb, Mo, Ba, Hf, La, or a mixture thereof.

2. The positive active material as claimed in claim 1, wherein the metal compound capable of intercalating/deintercalating lithium includes at least one of $Li_aLi_aA_{1-b}X_bD_2$ ($0.90 \leq a \leq 1.8$, $0 \leq b \leq 0.5$); $Li_aA_{1-b}X_bO_{2-c}T_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}T_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$); $Li_aCoG_bO_2$ ($0.90 \le a \le 1.8$, $0.001 \le b \le 0.1$); $Li_aMnG'_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMnG'_bPO_4$ ($0.90 \le a \le 1.8$, $0.001 \le b \le 0.1$); $LiNiVO_4$; and $Li_{(3-f)}J_2(PO_4)_3$:

wherein A is Ni, Co, Mn, or combinations thereof; X is Al, Ni, Co, Mn, Cr, Fe, Mg, Sr, V, a rare earth element, or combinations thereof; D is O, F, S, P, or combinations thereof; E is Co, Mn, Ni, or combinations thereof; T is F, S, P, or combinations thereof; G is Ni, Al, Cr, Mn, Fe, Mg, La, Ce, Sr, V, or combinations thereof; G' is Ni, Al, Cr, Fe, Mg, La, Ce, Sr, V, or combinations thereof; Q is Ti, Mo, Mn, Ni, or combinations thereof; Z is Cr, V, Fe, Sc, Y, Ni, or combinations thereof; and J is V, Cr, Mn, Co, Ni, Cu, or combinations thereof.

3. A rechargeable lithium battery, comprising:
a positive electrode;
a negative electrode; and
an electrolyte,
wherein the positive electrode includes a current collector and a positive active material layer on the current collector, the positive active material layer including the positive active material as claimed in claim 1.

4. The rechargeable lithium battery as claimed in claim 3, wherein the electrolyte includes a non-aqueous organic solvent and a lithium salt.

5. The rechargeable lithium battery as claimed in claim 3, further comprising a separator between the positive electrode and the negative electrode.

6. The rechargeable lithium battery as claimed in claim 5, wherein the separator is a single-layer or a multi-layer structure including at least one of polyethylene, polypropylene, and polyvinylidene fluoride.

7. The positive active material as claimed in claim 1, wherein the metal oxide includes aluminum oxide.

* * * * *